United States Patent [19]

Harvey

[11] 4,264,169

[45] Apr. 28, 1981

[54] PHOTOGRAPHIC FILM UNIT AND CARTRIDGE ASSEMBLY

[75] Inventor: Donald M. Harvey, Webster, N.Y.

[73] Assignee: Eastman Kodak Company, Rochester, N.Y.

[21] Appl. No.: 774,716

[22] Filed: Mar. 7, 1977

[51] Int. Cl.³ .............................................. G03B 1/00
[52] U.S. Cl. .................................... 354/121; 430/496
[58] Field of Search .............. 354/121, 203, 275, 150, 354/120, 175; 352/102, 103; 96/67, 201; 430/496

[56] References Cited

U.S. PATENT DOCUMENTS

| | | | |
|---|---|---|---|
| 1,563,551 | 12/1925 | Bulask | 352/103 |
| 2,188,974 | 2/1940 | Dilks | 354/121 |

Primary Examiner—John Gonzales
Attorney, Agent, or Firm—M. S. Sales

[57] ABSTRACT

A photographic film unit comprising a preferably disk-shaped photographic film sheet that is attached to a central hub and which may be incorporated in a compact cartridge assembly for acceptance by a cooperating camera. The film disk defines an array of photographic imaging areas effectively ringing the hub for sequential positioning at a cartridge exposure window for exposure to scene light by the camera. Incorporated structural features facilitate manipulation of the film unit not only during use in the camera but also during post-exposure operations such as photographic processing, printing and viewing.

38 Claims, 20 Drawing Figures

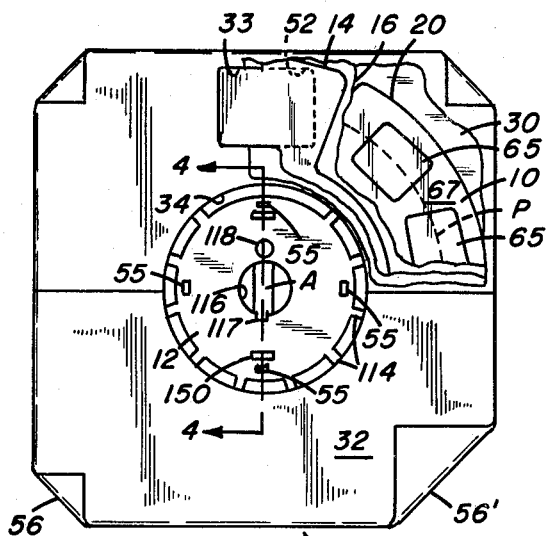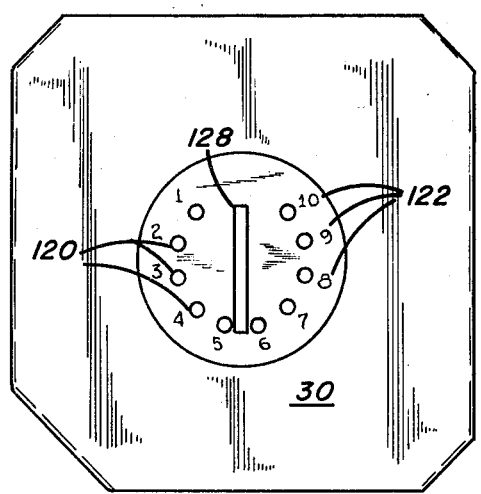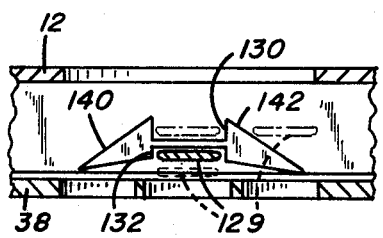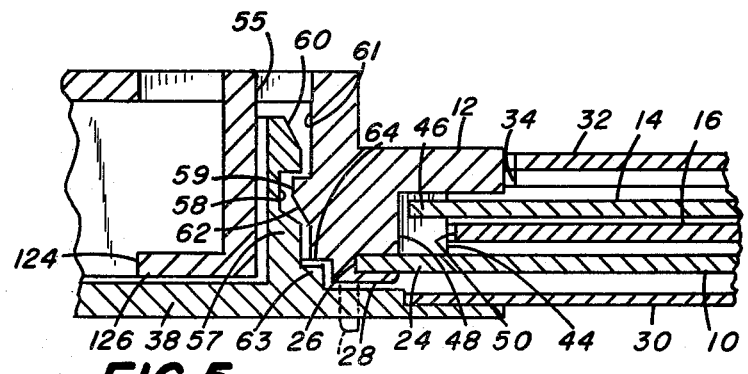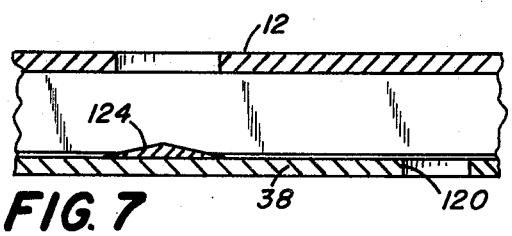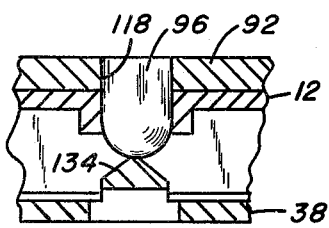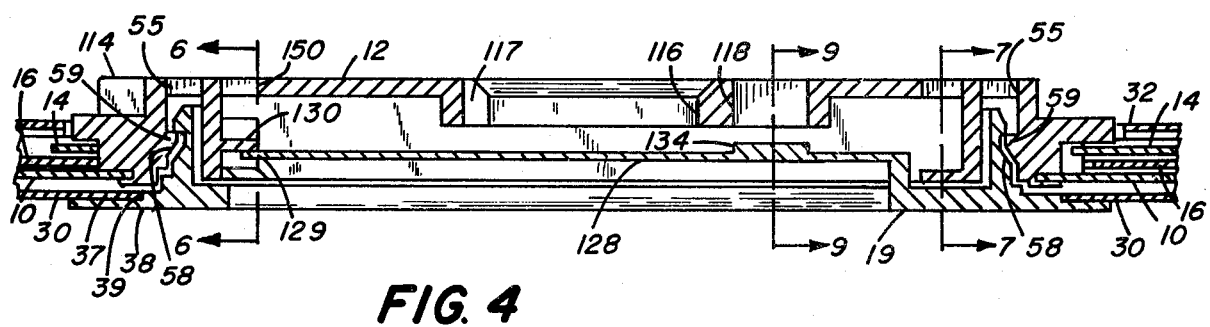

U.S. Patent Apr. 28, 1981 Sheet 5 of 5 4,264,169
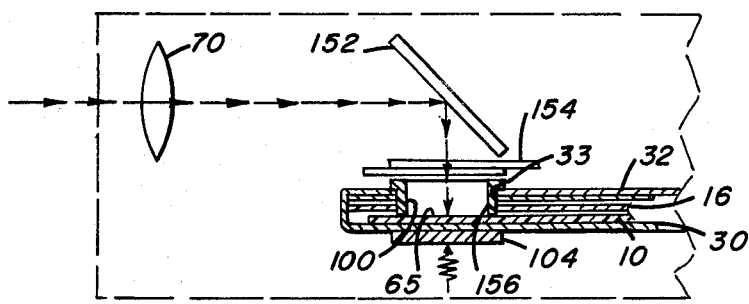
FIG. 17
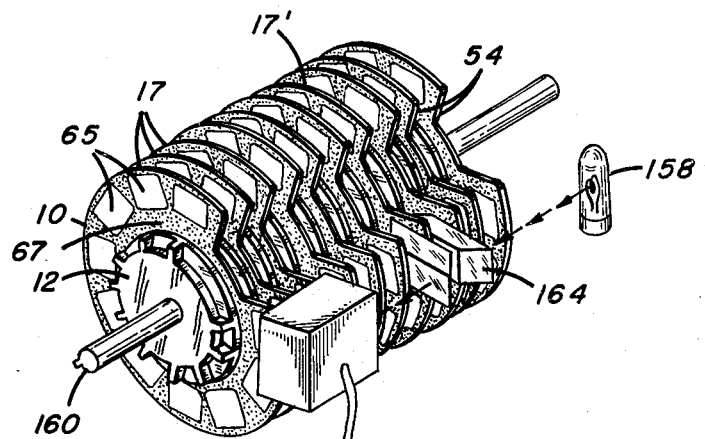
FIG. 18
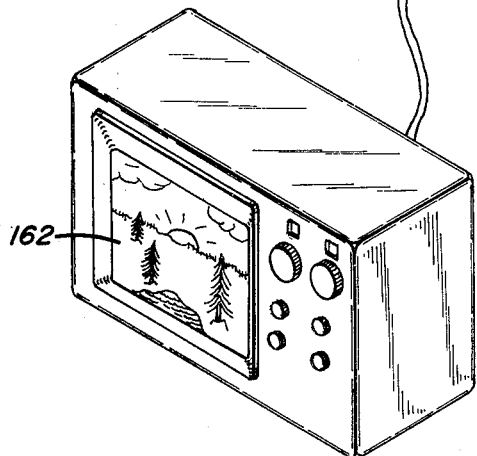
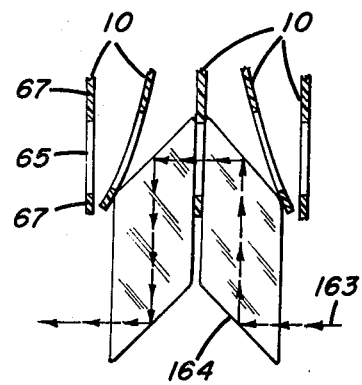
FIG. 19

PHOTOGRAPHIC FILM UNIT AND CARTRIDGE ASSEMBLY

CROSS-REFERENCE TO RELATED APPLICATIONS

Reference is hereby made to commonly-assigned copending U.S. patent applications Ser. No. 744,715 entitled PHOTOGRAPHIC CAMERAS, now abandoned, and Ser. No. 774,722 entitled METHOD AND APPARATUS FOR TREATING ELEMENTS OF PHOTOGRAPHIC FILM, now U.S. Pat. No. 4,112,454, both filed in the name of Donald M. Harvey on even date herewith; and Ser. No. 774,721, entitled APPARATUS FOR PROCESSING PHOTOGRAPHIC FILM, now U.S. Pat. No. 4,112,452, filed in the name of David L. Patton on even date herewith.

BACKGROUND OF THE INVENTION

1. Field of the Invention

The invention described herein relates to a photographic film unit comprising a photographic film disk attached to a central hub and adapted to cooperate with other photographic apparatus. The film unit may be incorporated in a compact cartridge assembly for cooperation with an associated camera.

2. Description Relative to the Prior Art

It has become commonplace in recent years to package photographic film in a cartridge, cassette, magazine or the like designed to afford convenient loading of a camera by simple insertion of the film-loaded package into the camera. A typical such package may be configured to accommodate an elongated strip of photosensitive roll film that is advanced lengthwise to bring successive spaced exposure areas into optical alignment with the camera's lens structure for exposure to scene light. Alternatively, it is also well known to position a plurality of exposure areas in a generally circular array on a disk-shaped sheet of film and to rotate such sheet incrementally to bring successive exposure areas into position for exposure by the camera. Typical advantages of such a film disk over roll film include the relative compactness of the film package and the relative flatness exhibited by the film.

An illustrative example of a film disk having circularly-arranged exposure areas is shown in U.S. Pat. Nos. 509,841 and 517,539 which issued respectively, on Nov. 28, 1893 and Apr. 3, 1894. As seen therein, a plurality of imaging areas are located along the outer perimeter of a film disk. The disk is received within a camera (sold under the trademark "Photoret") and is clamped, along its outer perimeter, to a flat internal face of the camera back wall. Incremental rotation of the back wall with respect to a lens and shutter assembly carried by the camera front wall moves successive exposure areas into optical alignment with the camera lens. Although the camera includes means for precluding the same exposure area from being exposed twice in immediate succession, no provision is made for preventing the film disk from being double exposed by rotation through more than one complete revolution. The positioning of the exposure areas on the film is determined solely, and thus relatively imprecisely, by camera mechanisms regulating the relative rotational movement of the camera back wall.

U.S. Pat. No. 1,773,106 which issued on Aug. 19, 1930 describes a film disk and an associated camera wherein the disk is mounted to the camera by means of a central hole in the disk which receives the threaded end of an incrementally-rotatable camera shaft. The disk is secured to the shaft by a threaded fastener, whereby rotation of the shaft brings successive exposure areas into position. In addition to including means for preventing a given exposure area from being immediately re-exposed, the described camera also includes an interlock device controlled by the film compartment door to prevent operation of the camera shutter after the disk has made one complete revolution and until the door is opened to remove the exposed disk. However, no means is provided to prevent an exposed film disk from being re-inserted into the camera and re-exposed therein, and the exposure areas are positioned on the disk solely by means of camera mechanism limiting the arc of travel of the rotatable camera shaft.

An additional disadvantage associated with each of the camera-film arrangements described above is the absence of a protective encasement for containing the film disk. As a consequence, loading the film into the camera may prove to be at least inconvenient, inasmuch as loading must be done in total darkness, and may lead to mis-loading or to damage to the film. U.S. Pat. No. 2,446,200 issued on Aug. 3, 1948 and U.S. Pat. No. 2,531,651, No. 2,531,652 and No. 2,531,653 all of which issued on Nov. 28, 1950 describe a product which was sold under the trademark "Foto-Disc" wherein a film disk is clamped between two plates in a protective cartridge to which a lens and shutter assembly may be temporarily attached. A movable shield covers an exposure window in the cartridge during such times as the camera is detached from the cartridge. The user rotates a ring carried by the cartridge to advance the film disk into position relative to the attached camera preparatory to exposure. An abutment on the cartridge precludes rotating the film disc through more than one complete revolution, while cartridge detents establish indexing for the respective exposure areas.

Another camera-cartridge combination produced in Japan beginning in about 1949 and marketed under the trademark "Petal" comprised a sub-minature camera and an all-metal disk film cartridge. The cup shaped rear casing of the cartridge, to which the perimeter of the film disk is clamped, is received within and keyed to a rotatable externally accessible portion of the camera housing. The front cartridge wall includes an aperture covered by a pivotal spring-loaded shield. Initial rotation of the cartridge uncovers the aperture and subsequent incremental rotation, indexed by a detent device, brings successive exposure areas into optical alignment with the camera lens. No means are provided for preventing double exposures and the cartridge apparently must be returned to the film processor for reloading.

Still another sub-minature camera of this same general type was sold under the trademark "Steinneck" and is disclosed in U.S. Pat. No. 2,625,087 issued on Jan. 13, 1953. This camera resembles a wrist watch and uses a film cartridge intended to be reloaded by the film processor. The cartridge includes two superimposed closure plates, each of which is provided with an exposure window and an arcuate transport tooth window. One of the closure plates is stationary with respect to the cartridge housing and the other one is rotatably moveable. Whenever the cartridge is removed from the camera, the windows in these two plates are out of alignment with each other to prevent accidental exposure of the film. Upon installation of the cartridge into the camera relative rotation of the movable plate aligns the exposure windows with the camera's objective lens and shutter and also aligns the arcuate windows to admit a film transport tooth into the interior of the cartridge. A rotatably supported hollow bushing within the cartridge carries a transport disk that is located immediately behind the closure plates and provided with spaced exposure apertures and with corresponding peripheral transport notches. Stacked on the bushing behind the transport disk are the film disk, a film positioning disk, a tension disk and a counter disk, each of which is provided with an edge notch engaged with a pin on the transport disk to keep all of these disks in fixed rotational relation to each other. Each operation of the shutter operating lever causes the shutter momentarily to open and reclose and then actuates the movement of the transport finger, which engages the next transport notch in the transport disk and rotates the latter to thereby angularly move all of the magazine disks in unison so that the next exposure area is brought into exposure position. The counter disk is provided with a circular row of numbers corresponding to the film exposures and a window in the back of the magazine allows the photographer to see the counter disk number indicative of the number of exposures remaining to be made. Removal of the magazine from the camera automatically closes the exposure and transport finger windows and, if not all of the available exposures have been used, the magazine can later be reinstalled to expose the remaining exposure areas. The same transport disk pin that prevents relative rotation between the various disks also cooperates with a stationary plate behind the counter disk to limit the rotation of the rotatable disks to 360 degrees, thereby preventing reexposure of the film in a previously exposed cartridge.

SUMMARY OF THE INVENTION

In a presently preferred embodiment of the invention, a disk-shaped photographic film sheet is united with a three-dimensional central hub to form a film unit that facilitates not only film handling and exposing within a camera, but also facilitates post-exposure operations such as photographic processing, printing and viewing. The film disk defines a plurality of exposure areas residing along a generally circular path extending substantially around the hub.

In contemplation of its use in a cooperating camera, the film unit is rotatably supported within a protective casing to form a slim, pocketable cartridge assembly that may be inserted in the camera. The cartridge assembly facilitates simple, but precise, support of the film disk in a predetermined focal plane and also includes a cover slide and an apertured framing septum that cooperate to protect the film from extraneous light rays. The hub affords means, engageable not only by the camera but also by processing, printing and/or viewing apparatus, for use in handling the film unit including incrementally rotating the film unit through a predetermined arc of travel around a central axis of rotation defined by the hub. Individual film exposure areas may thus be positioned with both accuracy and repeatability during exposure, as well as post-exposure, operations. A twin-mode locking means defined entirely by the cartridge assembly locks the hub to prevent undesired film unit rotation relative to the casing. In a first mode, film unit rotation is precluded prior to release of the lock by the insertion of the cartridge assembly into the camera. In a second mode, relative film unit rotation after exposure and removal of the cartridge assembly from the camera is also precluded . . . but in a manner different from the first mode so that the lock cannot be again released by reinserting the cartridge assembly in the camera. Other aspects of the invention and more specific features thereof will become apparent, from the following description, to those skilled in the art.

BRIEF DESCRIPTION OF THE DRAWINGS

FIG. 2 is a plan view of one face of the cartridge assembly shown in FIG. 1 with a portion of one outer casing member wall removed;

FIG. 3 is a plan view of the opposite face of the cartridge assembly of FIG. 1;

FIG. 4 is a fragmentary enlarged cross-sectional view taken along line 4—4 of FIG. 2;

FIG. 5 is an enlarged view of a portion of FIG. 4;

FIG. 6 is a cross-sectional view taken along line 6—6 of FIG. 4;

FIG. 7 is a cross-sectional view taken along line 7—7 of FIG. 4;

FIG. 9 is a cross-sectional view taken along line 9—9 of FIG. 4;

FIG. 17 is a partial cross-sectional view showing a cartridge assembly positioned for exposure in a camera;

FIG. 18 is a perspective view of a plurality of film units arranged for handling subsequent to exposure;

FIG. 19 is a cross-sectional view taken along line 18—18 of FIG. 17; and

DESCRIPTION OF THE PRESENTLY PREFERRED EMBODIMENT

Various terms such as "cartridge", "cassette" and "magazine" have been used to refer to film containers. Such a container, when loaded with film, is herein referred to as a "cartridge assembly". Because cartridges, cartridge assemblies and photographic cameras for use therewith are well-known, the present description is directed in particular to elements forming part of or cooperating more directly with cartridge assembly elements to which the present invention is specifically directed. Apparatus that is not specifically shown or described herein is understood to be selectable from apparatus shown in the art.

Figure 1:
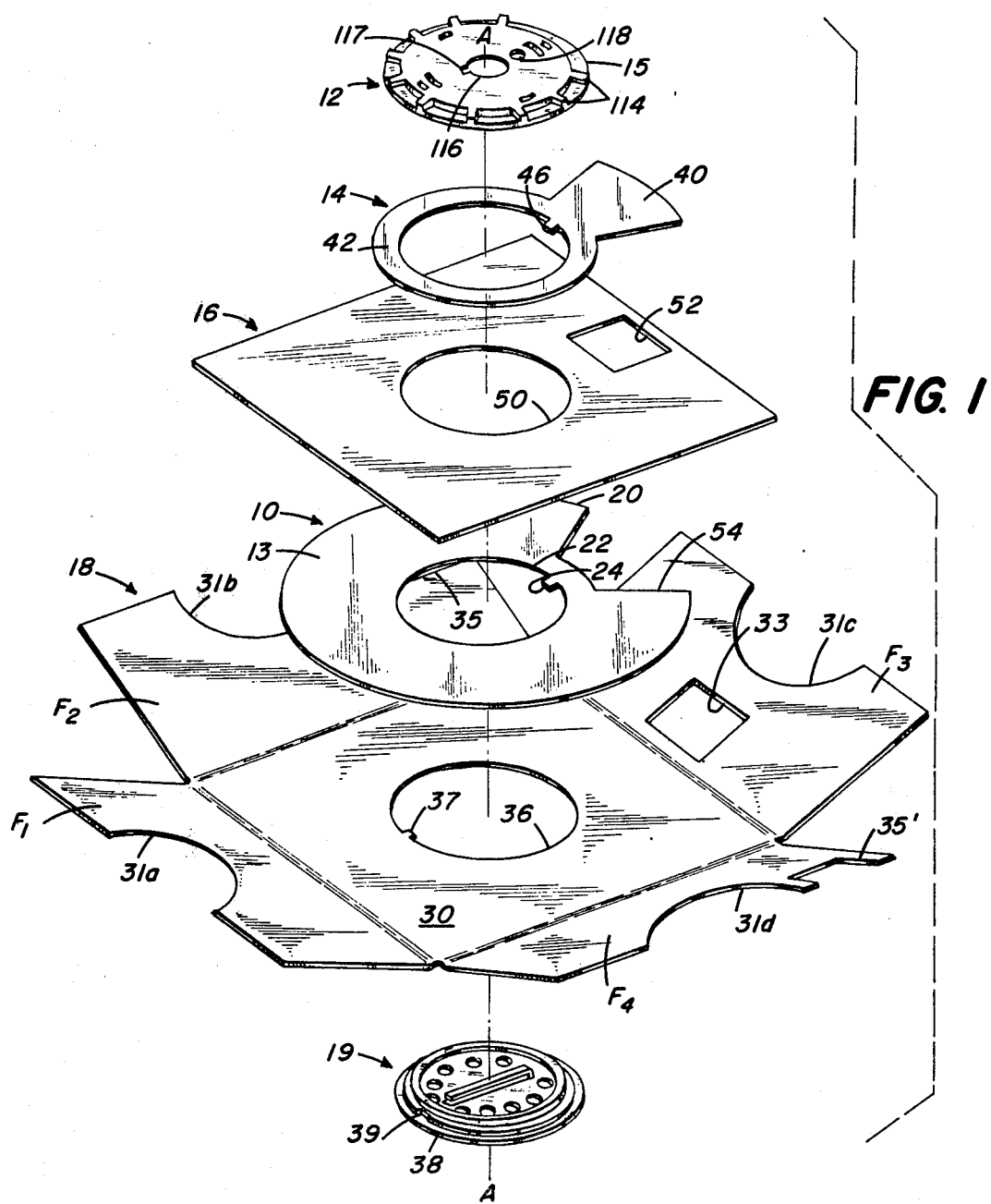
FIG. 1 is an exploded perspective view of the photographic cartridge assembly described herein.
Figure 20:
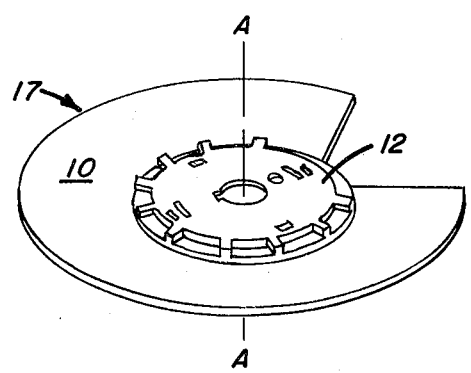
FIG. 20 is a perspective view of a film unit as described herein.
Figure 15:
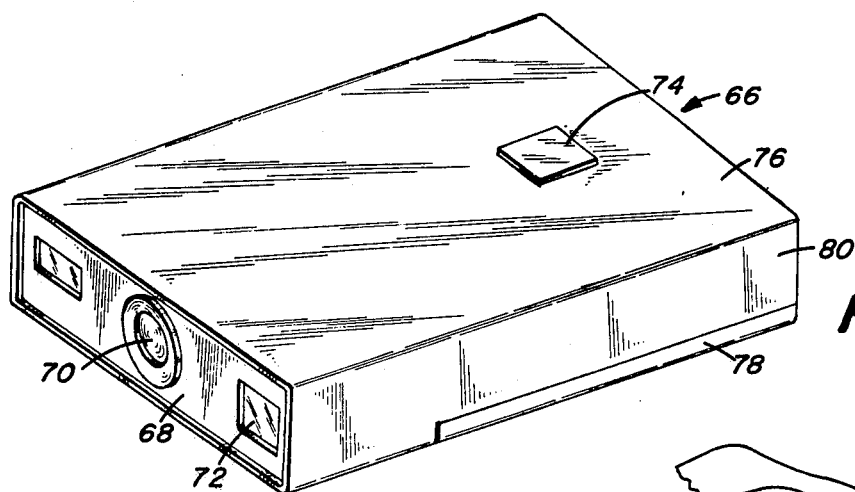
FIG. 15 is a perspective view illustrative of a camera for use with the cartridge assembly described herein.
Figure 16:
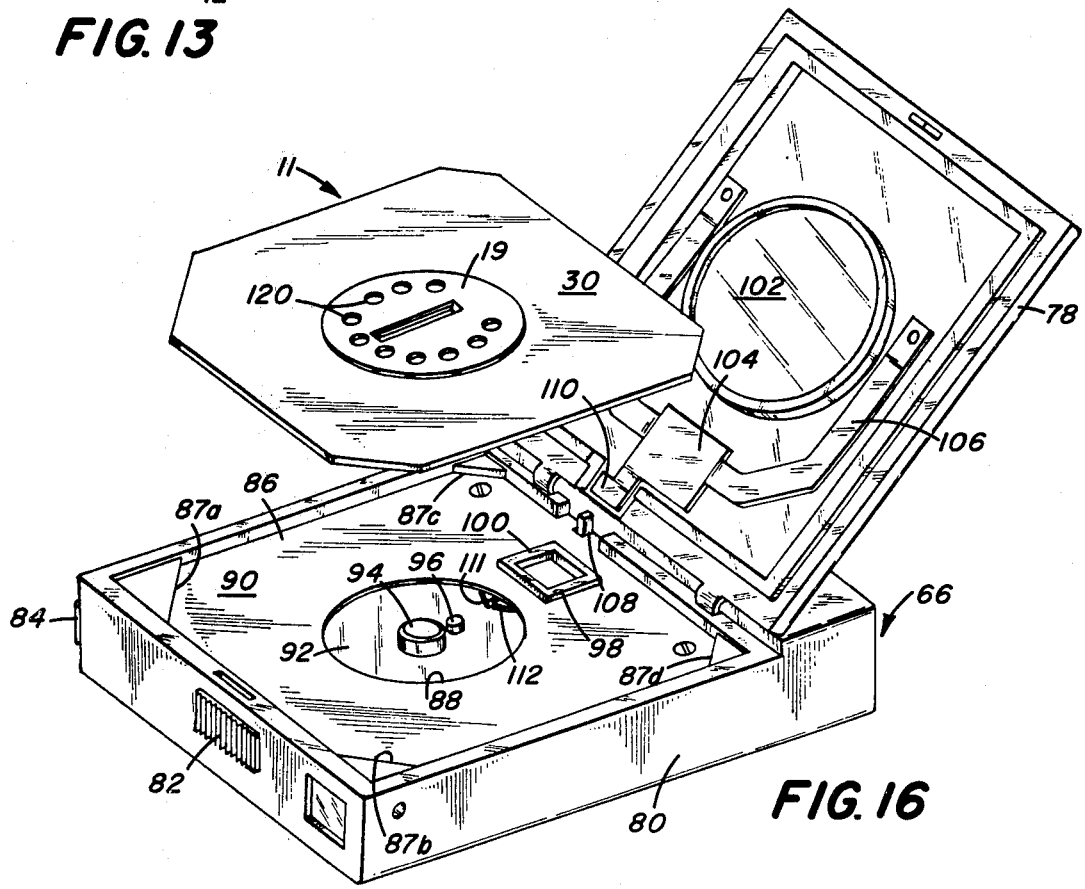
FIG. 16 is a perspective view of the camera of FIG. 15 and the cartridge assembly described herein and showing the camera film compartment door in an open position.

FIG. 1 shows, in exploded perspective, a cartridge assembly as described herein. The cartridge assembly is comprised of a film assembly and a casing. The film unit assembly includes a film unit 17 (comprised of a film disk 10 and a hub 12 . . . see FIG. 20) together with a cover slide 14 and a framing septum 16. The casing comprises a casing member 18 including a hub support 19. The cartridge assembly (see also FIGS. 2 and 3) is adapted to cooperate with a camera of the type illustrated in FIGS. 15 and 16 and as more fully described in my aforementioned copending U.S. Patent application Ser. No. 744,715 entitled PHOTOGRAPHIC CAMERAS.

The film sheet 10, as shown herein, is formed in the shape of a disk with a generally circular outer perimeter 20. Although herein referred to as a "disk", other non-circular (e.g. polygonal) film sheet shapes such as hexagonal or octagonal may, however, be visualized for use in accordance with the present invention. The film disk 10 comprises a moderately flexible but self-supporting base sheet which may be formed of, for example, cellulose acetate of poly(ethylene terephthalate), the latter being sold under the trademark "Mylar". The base sheet carries photosensitive elements on one face thereof, thus providing a photographic imaging surface 13 on which a latent photographic image may be recorded and subsequently photographically developed.

The hub 12 and the film disk 10 are attached in predetermined alignment at a central film sheet opening 22 and advantageously remain attached for handling as a unit not only during in-camera exposure but also during processing, printing, viewing and other post-exposure operations. The film unit thus has first and second faces which face in opposite directions along a film unit axis of rotation A. The hub, being mounted in the film disk opening 22, thus defines (by means of its correspondingly opposed faces) a portion of each of the film unit faces (see FIG. 20). Both faces of the hub are thus available to carry structure of the type hereinafter described for handling the film unit.

The hub 12, which may be formed by suitable plastic molding techniques, includes a stepped ring structure 15, a portion of which projects through the central film sheet opening 22. During manufacturing operations, the film and hub are preliminarily aligned in predetermined relationship by means of a key 24 on the film sheet which projects into the central opening 22 and is closely received within a correspondingly shaped keyway 26 (see FIG. 5) defined by the hub. The film disk may then be secured to the hub by, for example, a suitable adhesive. Alternatively, if the hub 12 is comprised of a deformable material such as polystyrene, the film disk may be secured by applying heat and/or pressure to the hub. FIG. 5 shows a finger 28 which is formed adjacent the hub keyway 26 and which may be deformed (from its initial position shown in phantom in FIG. 5) onto the surface of the film sheet 10 to secure the key 24 within the keyway 26. Additional areas of film-hub attachment may be provided along the disk-hub interface as necessary to assure that aligned attachment is maintained throughout the useful life of the film unit.

Casing member 18, which is opaque and may be formed of paperboard, plastic sheeting or the like, defines a first wall 30 and a double-layered second wall 32 which is formed by flaps $F_1$, $F_2$, $F_3$, and $F_4$ extending from the first wall 30. As more fully explained in connection with FIG. 16, at least a portion of the first casing wall 30 is advantageously thinned and flexible relative, at least, to the second wall 32, inasmuch as the first wall 30 is of only a single thickness. During cartridge assembly manufacturing operations, the flaps $F_1$–$F_4$ are folded into place and secured, as by a suitable adhesive, to house the film unit assembly. Semicircular openings 31a, 31b, 31c and 31d on the outer edges of, respectively, the flaps $F_1$, $F_2$, $F_3$, and $F_4$ align to cooperatively form a central circular aperture 34 (See FIG. 2) which is sized to admit a portion of the hub 12 and thereby render one face of the hub 12 accessible to a film-advancing mechanism of a camera. A rectangular exposure window 33 is defined by flap $F_3$ (and correspondingly, in flaps $F_2$ and $F_4$, by cooperating cutout portions 35 and 35' which register with the window 33 when $F_2$ and $F_4$ are folded into position beneath flap $F_3$).

As seen in FIGS. 2 and 3 the casing member 18 may be asymmetrically shaped, as by means of unevenly dog-eared corners (compare 56 and 56') to cooperate with a correspondingly shaped camera pocket to assure that the cartridge will be insertable in the camera in a predetermined orientation only.

The casing 18 includes a hub support structure 19. The first casing wall 30 defines a generally centrally located opening 36 within which a circular hub support 19 is secured, such as by suitable adhesion to the first wall 30. Alternatively, the support 19 could be formed integrally with the casing 18 as by known plastic molding techniques. The film unit 17, by means of its hub 12, is mounted on the hub support 19 by a snap-latching arrangement which, as described in greater detail below, holds the film unit and the hub support in assembled relationship while permitting relative rotation of the film unit with respect to the support 19.

The passage of light rays through the exposure window 33 and onto the photosensitive film disk 10 is precluded (when the cartridge assembly is not protectively encased by a camera) by means of a cover slide 14 and a framing septum 16. The cover slide 14 may be formed of suitably thin but relatively stiff opaque sheet material and includes a generally fan shaped leaf portion 40 so sized as to cover the exposure window 33. The cover slide 14 also includes a ring portion 42 that encircles an annular shoulder 44 (FIG. 5) on the hub 12 and defines at least one keying projection 46 that is closely receivable within a hub keyway 48 whereby the cover slide is positioned and retained on the hub 12 for rotation with the film unit. The framing septum 12 may also be formed of an opaque sheet material and defines a central aperture 50 sized and located to admit the hub shoulder 44. The framing septum also includes a framing window 52 corresponding generally in shape and size to, and aligned with, the cartridge exposure window 33. The septum 16 is shaped to nest closely within the casing member 18 and is thereby constrained against rotation relative to the member 18.

When the cartridge assembly is not encased in a camera, the film unit is so oriented within the casing 18 (by the initial hub locking mechanism described below) as to place the leaf portion 40 of the attached cover slide 14 in light-blocking relationship with the cartridge exposure window 33 and the framing septum window 52. Inasmuch as the cover slide leaf 40 is sized larger than the aligned windows 33 and 52 between which it is interposed, a labyrinthine light baffling arrangement is created to restrict the access of actinic light rays to the film disk 10 through the windows 33 and 52.

Certain film disk base sheet materials, such as poly (ethylene terephthalate) may exhibit the ability to "light pipe", i.e., distribute impinging light rays internally within the sheet, and thereby fog the photosensitive elements carried by the sheet even in areas of the sheet that are remote from the point of impingement. As a precaution against such fogging, edge areas of the film disk 10 define a segmental indentation 54 extending inwardly from the outer film disk perimeter 20. The notch subtends an area along a circular exposure arc path P that is at least as large as one of the exposure areas 65 (FIG. 2). The notch 54, together with the film disk areas bordering the notch 54, are overlain by the cover slide fan 40. The film disk area located proximate the aligned exposure windows 33 and 52 is thus minimized by the indentation 54 so as to further protect the film from any scattered light rays which may infiltrate the labyrinthine light lock such as during prolonged exposure of the cartridge assembly to a light source.

FIG. 5 depicts an enlarged partial cross-sectional view through a cartridge assembly. As seen therein, the cartridge assembly components are retained in assembled relationship by the engagement of the hub 12 and the hub support 19. The hub support 19 which is disposed within the circular opening 36 in the first casing wall 30, includes a generally circular base plate 38 defining a circumferential shelf on which the opening-defining edge of the first casing wall 30 is adhered by a suitable adhesive. A key 37 on the first wall 30 interfits with a keyway 39 on the hub support 19 to preliminarily orient the support relative to the cartridge during manufacturing operations. A cylindrical wall 57 arises from the support base plate 38 and defines, on its radially outer surface, a groove 58 extending around the circumference of wall 57 and, at its distal end, an outwardly beveled face 60. When the support 19 and the hub 12 are assembled, the cylindrical wall 57 telescopes within a depending cylindrical wall 61 carried by the hub 12. A plurality of radially inwardly projecting latching teeth 59 are spaced along the wall 61, each such tooth including a sloped camming surface 62. During assembly operations, sliding engagement between the camming surfaces 62 and the bevel 60 guides the walls 57 and 61 into telescoping engagement and the resultant wedging action produces some slight flexing of one or both of the walls 57 and 61 to permit the latching teeth 59 to slide axially along the wall 57 until they snap into latching engagement with the circumferential groove 58. The relative sizing and location of the groove 58 and the latching teeth 59 provides a reliable but relatively loose fitting latching engagement so as to retain the hub 12 and the support 19 in telescoping relationship while permitting relative rotation of the hub with respect to the hub support. The telescoped walls 57 and 61 additionally cooperate to define a labyrinthine light lock tending to protect the film disk 10 from fogging by light rays which may enter any of the several openings in the hub or hub support that are surrounded by the walls 57, 61. A step-like ring portion 63 of the hub support 19 cooperates with an annular recess 64 at the base of hub wall 61 to provide an additional labyrinthine barrier protecting the film disk 10 from fogging.

When it is necessary to remove the film unit from the cartridge assembly for photographic processing, the hub 12 may be unlatched from the hub support 19 by inserting a suitable, e.g., a wedge-shaped, probe into the coring holes 55 which are associated with respective ones of the latch fingers 59 and which also facilitate injection molding of the latch fingers. By means of the inserted probe the annular hub support wall 57 and/or the hub 12 may be relatively flexed to release the fingers 59 from the circumferential notch 58, thereby unlatching the hub from the hub support. The casing 18 may be opened for extraction of the film unit assembly by slitting or tearing. Preparatory to processing, the cover slide 14, since it is not permanently affixed and since its function is completed after the film unit is removed from the cartridge assembly, may be stripped from the hub 12 and discarded, thereby also eliminating the possibility of photographic processing fluid being entrapped between the cover slide and the film sheet. Similarly, the framing septum 16, being only loosely retained on the hub 12 by the central septum aperture 50, is stripped from the film unit and discarded. Both the cover slide 14 and the septum 16 may be provided with structurally weakened tearlines to facilitate their removal from the hub.

The film disk 10 is arranged to record photographic images in a plurality of exposure areas 65 (see FIG. 2) which are spaced along a circular path P that is concentric with the film unit axis A (which is defined by the center of a circular hub bore 116 . . . See FIG. 2) and is disposed between the outer perimeter 15 of the hub 12 and the outer film sheet perimeter 20. Desirably, the image areas 65 are defined by a surrounding border area 67 which has been photographically pre-exposed (and is thus no longer light sensitive) prior to exposure of the exposure areas in the camera. Such pre-exposure may be included as part of the cartridge assembly manufacturing operation and, in combination with the indexing means described below, assures that the latent images generated on the photosensitive film sheet will lie, if at all, in predetermined locations (i.e., the exposure areas) on the sheet.

In order that a desired image area may be precisely positioned in a camera, or in the gate of a printer, viewer or other apparatus, the hub 12 includes means engageable by cooperating members of such apparatus for relatively advancing the film unit and positioning the respective exposure areas. Such a camera, which is more fully described in my copending application Ser. No. 774,715 entitled PHOTOGRAPHIC CAMERA, is illustratively shown in FIGS. 15 and 16, the view of FIG. 16 being inverted and reversed relative to that of FIG. 15. As seen therein, the camera 66 includes a front wall 68 provided with an objective lens 70 and a viewfinder lens 72. A rectangular shutter operating button 74 is disposed on the camera top wall 76. A cover door 78 (shown in an open position in FIG. 16) is hinged to the camera housing 80. A latching mechanism which is releasable by a release button 82 retains the door in a closed position. A pivotally-mounted film advancing lever 84 (only partially visible in FIG. 16) is provided for use in film advancing operations.

The camera defines a shallow internal pocket 86 sized and asymmetrically shaped to receive the cartridge assembly 11. Diagonal corner walls 87a–87d correspond to the asymmetrical cartridge casing corners (see 56, 56') to assure that the cartridge assembly can be inserted in only a single, predetermined orientation. A circular central opening 88 in a cover plate 90 exposes a circular driving disk 92 that is rotatably supported on a stationary spindle 94 operable to be received within a central bore 116 in the hub 12. The driving disk also carries an eccentrically mounted coupling pin 96 disposed to be received within an eccentrically located drive bore 118 in the hub 12. A rectangular opening 98 in the cover plate 90 accommodates a rectangular film support frame 100 which extends slightly above the adjacent flat face of the cover plate 90. When the cartridge assembly is inserted in the camera pocket a transparent cover door window 102 opposes the hub support base plate 38 of the cartridge assembly. A rectangular pressure plate or platen 104 is attached to the cover door 78 by a pair of resilient spring arms 106 which urge the platen 104 away from the door. When the door is closed, the platen 104 is aligned with the film support frame 100, but is held out of clamping engagement with a film disk 10 interposed therebetween by the action of a movable pressure-relieving finger 108 which projects through the cover plate 90 and into engagement with a pressure plate ear 110.

Figure 13:
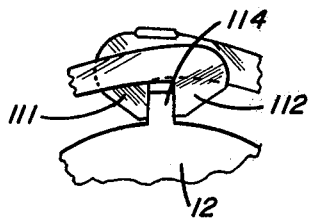
FIG. 13 is an enlarged view illustrating rotation of a film unit about its rotational axis.

As described in detail in my above-mentioned copending application Ser. No. 774,715 entitled PHOTOGRAPHIC CAMERAS, the camera 66 includes means for incrementally rotating the film unit 17 to sequentially advance the exposure areas 65 into an exposure position aligned with the cartridge assembly exposure window 33 and the film support frame 100. An advancing pawl 112, disposed at the periphery of drive disk 92, is so mounted and mechanically interconnected with the film advance lever 84 as to reciprocate along an arcuate path coincident with a portion of the perimeter of drive disk 92 in response to actuation of the lever 84. A pivotally-mounted positioning pawl 111 is also mounted proximate the periphery of drive disk 92 in the area of advancing pawl 112 and is mounted to move between the blocking position shown in FIGS. 13 and 16 and a retracted position (not shown).

In order that a desired exposure area 65 may be precisely positioned for exposure by a camera (or positioned at the gate of a printer, viewer or other apparatus) the hub 12 incorporates a plurality of generally radially extending indexing teeth 114, disposed in a generally circular path along the perimeter of the hub 12 and corresponding in number to the number of exposure areas 65; (For illustrative purposes, ten teeth 114 are shown with their centerlines spaced 30° apart with an open area of 90° radially aligned with the segmental film sheet notch 54). Each exposure area bears the same predetermined spatial relationship to a corresponding index tooth as each of the other exposure areas bears to its corresponding tooth and this same relationship is desirably maintained in all film units of the type described herein. By precisely positioning the teeth 114 on the hub 12 and in predetermined relationship with the respective exposure areas 65 as described above, a given image area may be precisely located by mechanically engaging and positioning its associated hub tooth 114. Because of the relative durability and resistance to deformation of the hub indexing teeth as opposed, for example, to a simple film perforation as is commonly used in other film metering or indexing arrangements, the film unit can be repeatedly positioned with reliability, thereby facilitating post-exposure indexing operations such as printing and viewing.

Various mechanisms may be used to index the hub. For example, when used with the camera mechanism described above, at the commencement of a film indexing cycle the film positioning pawl 111 initially blocks advancement of the hub by engaging one side face of the next adjacent tooth 114 upstream from the hub indexing tooth that is associated with the exposure area to be advanced into exposing position. The film advancing pawl 112 translates along its arcuate path towards the tooth associated with the exposure area to be advanced, hooks over such tooth and reverses to move in the opposite direction along the arcuate path and thereby rotates the hub. The positioning pawl 111 is immediately moved to its retracted position to permit the hub to rotate under the impetus of pawl 112. After the tooth that was previously engaged by the positioning pawl 111 has moved past pawl 111, pawl 111 returns to its blocking position. Continued movement of the film advancing pawl 112 carries its engaged tooth into contact with the blocking pawl 111, whereupon rotation of the hub ceases. By accurately locating the pawl 111 in a predetermined position relative to the exposure position (as represented in the camera by the film support frame 100) the associated exposure area may be accurately positioned for exposure. A new advancement cycle is commenced in response to a new actuation of the lever 84, whereby each exposure area 65 may, in turn, be advanced into exposure position.

Alternatively, the hub 12 may be rotated solely by the use of the camera coupling pin 96 in engagement with the eccentric hub drive bore 118. In such an arrangement the drive disk 92 that carries the pin 96 may be tendency driven and a movable blocking pawl structured and positioned similar to the pawl 111 may be arranged to engage a hub indexing tooth 114 and thereby stop the rotation of the hub 12 to locate an associated exposure area 65 in exposure position. As a further alternative, if the drive disk 92 is carefully constructed so as to be accurately indexable through a predetermined arc, and if the hub drive bore 118 is precisely located relative to each of the exposure areas 65, the hub 12 may be rotated through precise incremental rotational arcs to advance corresponding consecutive exposure areas 65 into exposure position.

Figure 14:
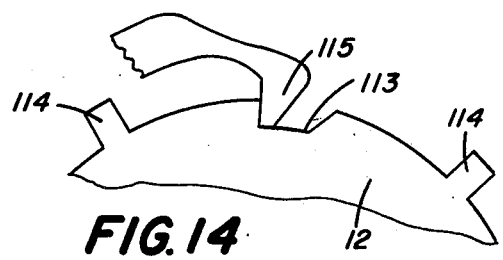
FIG. 14 is an enlarged view also illustrating film unit rotation.

In one camera arrangement, which is described more fully in my copending application Ser. No. 774,715 entitled PHOTOGRAPHIC CAMERAS, the hub 12 includes an additional discontinuity such as notch 113 (FIG. 14) which may lie in the circular path of the teeth 114 and be generally radially aligned with the segmental film disk indentation 54. A movable pawl 115 is provided in the camera to engage the discontinuity 113 and produce the initial rotation of the film unit 17.

To enable the photographer to determine which one of the several exposure areas 65 is positioned for exposure, an exposure numbering system is provided as seen with reference to FIGS. 3 and 5. FIG. 3 depicts a series of through-bores 120 formed in the hub support 19 and spaced along a concentric circular path at intervals corresponding to the intervals between the exposure areas 65. Each through-bore has an associated exposure area indentification number 122 carried on the hub support 19 and corresponding to one of the exposure areas 65. An L-shaped foot member 124 carried by the hub 12 at a predetermined location relative to the exposure areas 65 defines a surface 126 disposed in facing relationship with the hub support 19 and so located as to overlie the circular path along which the through-bores in support 19 are disposed. The surface 126 may be coated with a highly visible light-reflective material. As the hub 12 is indexed the surface 126 registers successively with respective ones of the through-bores 120 and is visible through the camera window 102 to indicate visually to the user which of the image areas is in position for exposure.

It will be apparent that rotation of the film unit while the cartridge assembly is not housed within a camera or other light-tight means will result in the exposure of at least those image areas that are rotated past the cartridge assembly exposure window and, perhaps, in the fogging of adjacent image areas. It will also be apparent that to rotate the film unit through more than one complete revolution will result in doubly exposing at least one of the image areas. Accordingly, the present invention incorporates a two-mode hub locking mechanism that is housed entirely within the cartridge assembly. In one locking mode rotation of the film unit is prevented prior to insertion of the cartridge assembly in a camera, and includes means for cooperating with the receiving camera to release the film unit for rotation. Another locking mode precludes rotation of the film unit through more than one complete revolution and cannot be released by re-inserting an exposed cartridge assembly into the camera.

Figure 8:
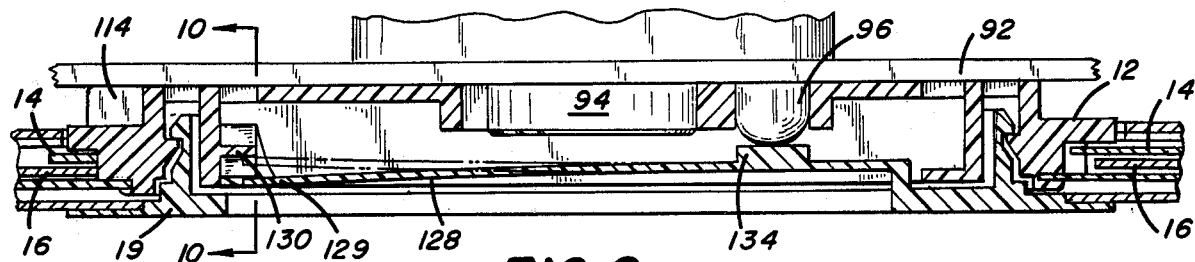
FIG. 8 is a cross-sectional view corresponding to the view of FIG. 4, including a portion of a cooperating camera mechanism, and showing the relationship of structural parts at an initial stage of operation of the cartridge assembly.
Figure 10:
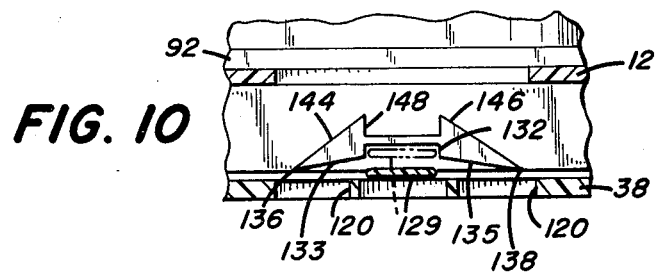
FIG. 10 is a cross-sectional view taken along line 10—10 of FIG. 8.

Reference is now made to FIGS. 4 and 8 which depict the mechanisms in an initial locking position wherein rotation is prevented prior to insertion of the cartridge assembly in a camera. As seen therein the hub support 19 carries an elongated flexible spring finger 128 attached at its proximal end to the support 19 and having a distal end 129 disposed to engage a latch member 130 carried by the hub 12. Prior to insertion of the cartridge assembly into a camera of the type shown in FIGS. 14 and 15 the end 129 of the spring finger 128 lies within (as seen in phantom in FIGS. 8 and 10) an initial latching detent 132 formed on the underside of the latch member 130. Initial locking engagement of the finger end 129 with the latching detent 132 precludes rotation of the hub 12 relative to the hub support 19. Because the locking mechanism is placed in the initial locking position during the cartridge assembly manufacturing operation, inadvertent film unit rotation (with resultant film exposure) is precluded prior to insertion of the cartridge assembly into a cooperating camera. Upon insertion of the cartridge into the camera 66 the camera driving pin 96, being of an appropriate length, penetrates the hub drive bore 118 and contacts a raised boss 134 on the facing surface of the finger 128 (see also FIG. 9). Contact by the pin 96 flexes the finger 128 downward thereby freeing its distal end 129 from the initial latching detent 132 and releasing the hub 12 for rotation relative to the hub support 19. As the hub 12 is rotated the drive pin 96 slides off the finger boss 134 and the distal finger end 129 is cammed along one of the downward-facing cam surfaces 133, 135 of the latch 130 until, depending upon the direction of hub rotation, it slides from beneath the tip of one of the tapered wings 140, 142 of the latch 130 and flexes upward to a neutral position as shown in FIG. 4. Because the hub 12 is so mounted on the hub support 19 as to be rotatable in both clockwise and counterclockwise directions and because the latch 130 is symmetrically structured it is apparent that the hub 12 may be rotated in either direction following unlatching and, as described below, may also be relatched regardless of the direction of rotation.

Alternatively, the spring finger 128 may be freed from the first latching detent by means of a modified camera spindle. In such an arrangement (not shown), a camera spindle that is appropriately lengthened relative to the camera spindle 94 shown in FIG. 11 penetrates the central hub bore 116 a distance sufficient to contact the spring finger 128 and depress it to release the distal end 129 of the finger from the initial latch detent 132. Because the spindle coincides with the hub axis of rotation A, a lengthened spindle as described above bears continually on the finger 128. In such an arrangement the spindle length must be carefully controlled to avoid depressing the distal finger end 129 below the tips 136, 138 of the tapered wings 140, 142

Figure 11:
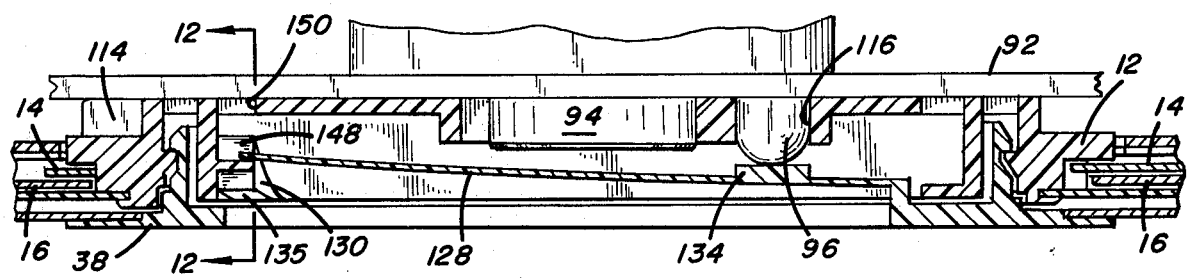
FIG. 11 is a cross-sectional view corresponding to the view of FIG. 8 and showing the relationship of structural parts at a later stage of operation of the cartridge assembly.
Figure 12:
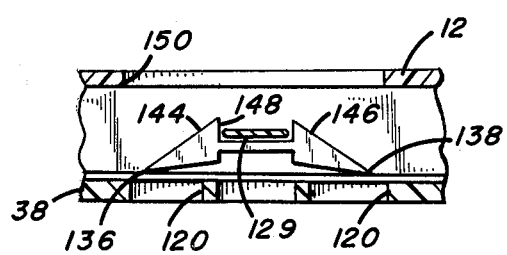
FIG. 12 is a cross-sectional view taken along line 12—12 of FIG. 11.

As hub rotation approaches a complete revolution, the spring finger again encounters the latch 130. However, as seen in progressing phantom positions in FIG. 6, the spring finger 128, (having snapped upward into its neutral position after being released from the latch) encounters, depending on the direction of rotation, one of the upward-facing cam surfaces 144, 146 of the latch 130. Continued rotation after such contact cams the distal finger end 129 upward and carries it into a final locking detent 148 that is positioned atop the latch 130 as seen in FIGS. 11 and 12. As also seen in FIG. 11 the finger 128, having been flexed upward beyond its neutral position by the camming action of one of the surfaces 144, 146, tends to remain engaged in the final lock detent 148 and resist dislodging. The pin 96 also is now unable to perform its unlocking function. Even though the pin bears on the boss 134 it continues to exert only a downwardly-applied force that is necessarily incapable of releasing the finger from the final locking detent. Having assumed the final locking position, it is apparent that the hub 12 cannot be rotated relative to the hub support 19 even if the finally-locked assembly is removed from and re-inserted into a camera. Because the cover slide fan 40 of a finally-locked cartridge assembly is necessarily in light-blocking relationship with the exposure window 52, the latent images recorded on the disk 10 are protected until the film unit is removed from the cartridge assembly for photographic processing.

In an alternative camera driving arrangement explored more fully in the above-mentioned copending application Ser. No. 774,715 entitled PHOTOGRAPHIC CAMERAS the film unit may be rotated a distance that is sufficient to bring all of the exposure areas sequentially into registry with the cartridge exposure window, but less than one complete revolution. The direction of the film unit rotation is thereupon reversed and the unit is returned to its initial position. It will be apparent that the latching arrangement herein described is adapted to accommodate such an alternate camera design. As indicated above, owing to the double-taper symmetrical design of the latch 130, i.e., the presence of oppositely facing wings 140 and 142, the spring finger 128 may approach and enter the final locking detent 148 by climbing either of the upward-facing cam surfaces 144, 146. Final locking is thereby assured regardless of whether the direction of rotation associated with final locking is the same as or opposite from the direction of rotation associated with unlocking.

The present invention also affords means for providing a visual indication that the cartridge assembly is in the final locking configuration, thereby avoiding confusion arising from attempted re-use of an exposed cartridge. A coring hole 150 located in the hub 12 and positioned above the latch 130 provides visual access to the distal tip 129 of the spring finger 128 when the finger is in the final locking detent 148. By coloring the upper surface of the tip of finger 128 with a highly-visible light-reflective coating, and perhaps by also providing appropriate label information proximate the hole 150, the appearance of the colored finger tip in the hole 150 remains the user that the film unit has been completely exposed.

In addition to the aforementioned features the present invention also provides for more precise positioning of the film sheet with respect to the camera focal plane. Such precise positioning is achieved by affording intimate film-camera contact by minimizing, or at least closely controlling, cartridge structures interposed between the film sheet and the camera supporting structure. As shown diagrammatically in FIG. 17, the cartridge bottom wall 30 is contacted at the exposure station of the camera 66 by the spring-biased platen 104. The cartridge bottom wall 30 is thinned (relative, at least, to the double-layered second wall 32) and is thus relatively flexible at least in the region thereof that is interposed between the camera platen 104 and the film disk 10. The rectangular film support frame 100 is so sized and shaped as to penetrate the windows 33 and 52 of the cartridge assembly and rest directly on the surface 13 of the film disk 10 as shown in FIG. 17. Images are then recorded on the film by means of the camera objective lens 70 in cooperation with a mirror 152 and a shutter assembly 154, as shown somewhat digrammatically in FIG. 17. Because of the thin bottom cartridge wall construction, the exposure area 65 of the film sheet 10 that is positioned for exposure is assured of being urged by the platen 104 into close contact with the support frame 100, and thus accurately positioned in the focal plane.

In an alternative cartridge assembly construction (not shown) the framing aperture 52 in the framing septum 16 is approximately the same size as the rectangular opening 156 defined by the film support frame 100. In such an arrangement, the frame 100 does not penetrate the window 52 but, rather, penetrates only the window 33 and rests upon the edges of the framing septum 16 that define the window 52. Because the septum 16 is desirably formed of a thin, flat sheet material of relatively uniform thickness, accurate positioning of the film relative to the frame 100 may be attained even though the frame 100 does not directly contact the film.

FIGS. 18 and 19 are illustrative of apparatus utilizing the advantages of the film unit described herein. In FIG. 18 a plurality of film units 17 bearing photographically developed images are arranged on a skewer 160 which is inserted through the central bores 116 defined by the film unit hubs 12. A longitudinal spline on the skewer interfits with keyways 117 in the bores 116 to position the film units in aligned non-rotating relation relative to the skewer. An optical viewer comprising a light source 158, an optical prism assembly 164 defining an optical path 163 and associated known optical and electrical components including a cathode ray tube 162 is arranged to permit viewing on the cathode ray tube of the images in the exposure areas 65 of the film units 17. The aligned segmental notches 54 of the film units 17 effectively define a channel in the film unit stack which permits the prism assembly to traverse parallel to the skewer 160 a distance sufficient to place the assembly 164 in alignment with a desired film unit (17'). The skewer, together with the film units mounted thereon, then need only be rotated through an arc calculated to align a desired one of the image areas 65 of the film unit 17' with the optical path defined by the prism assembly. The hubs 12 of the film units 17 afford a precise uniform spacing between adjacent film disks 10 which approximates the hub thickness. As seen in FIG. 19, the prism assembly may thus penetrate the stack of film disks 10 to engage a desired disk (17') without encountering interference from adjacent disks. Although, as seen in FIG. 19, the disks 10 on either side of the engaged disk may be subjected to some slight flexing, the spacing provided by the interposed hubs 12 avoids their being flexed into contact with adjacent disks.

The invention has been described in detail with particular reference to illustrative preferred embodiments thereof, but it will be understood that variations and modifications can be effected within the spirit and scope of the invention as described hereinabove and as defined in the appended claims.

I claim:

1. A photographic film unit adapted to be rotatably mounted in photographic apparatus, said film unit comprising:
    a hub member having an outer perimeter;
    means on said hub member adjacent to said outer perimeter for use in rotating said hub member in photographic apparatus; and
    a photographic film disk carried by said hub member, said disk having an area for images about said hub perimeter.

2. A film unit as claimed in claim 1 wherein:
    said film disk has a central opening; and
    said hub member extends through said central opening in said film disk.

3. A film unit as claimed in claim 1 further comprising means on said hub member for use in inhibiting rotation of said film unit in photographic apparatus.

4. A photographic film unit for use in a camera, said unit comprising:
    a hub;
    a photographic film disk carried by said hub for receiving a plurality of photographic image exposures in photosensitive areas in a generally circular disposition about said hub;
    non-photosensitive borders on said disk bounding said exposure areas; and
    a structural discontinuity, for cooperation with camera structure, located on said hub in predetermined angular relationship with respect to at least one of said borders.

5. A photographic film unit comprising:
    a photographic film disk;
    means on said disk defining a plurality of exposure areas at predetermined locations in a generally circular disposition;
    a hub member attached to said film disk and having an outer perimeter radially inwardly of said exposure areas; and
    means located in predetermined angular relationship with respect to said exposure areas for use in effecting incremental rotation of said film unit about an axis concentric with the disposition of said exposure areas.

6. A photographic film unit adapted to be rotatably mounted in photographic apparatus, said film unit comprising:
    (a) a photographic film disk having a plurality of photographic image areas in a generally circular disposition; and
    (b) a hub member attached to said disk and having an outer perimeter radially inwardly of said image areas, said hub member having a face and a structural discontinuity on said face in predetermined angular relationship with respect to at least one of said exposure areas for use in rotating said film unit in photographic apparatus.

7. A film unit as claimed in claim 6 further comprising means on said hub member for use in inhibiting rotation of said film unit in photographic apparatus.

8. A photographic film unit adapted to be rotatably mounted in an opaque cartridge having an exposure window, said film unit comprising:
a hub;
a photographic film disk carried by said hub and having an image area about the outer perimeter of said hub;
means on said hub for use in incrementally rotating said film unit in the cartridge such that different portions of said image area align with the exposure window; and
an open area in said film disk initially aligned with the exposure window whereby light entering the cartridge through the window will not impinge upon said disk, and movable out of alignment with the window upon rotation of said film disk.

9. A photographic assembly adapted to be rotatably mounted in an opaque cartridge having an exposure window, said assembly comprising:
(a) a photographic film unit comprising (1) a hub, (2) a photographic film disk on said hub, (3) a plurality of image areas on said film disk and (4) an intervening area not adapted for photographic images separating two adjacent ones of said image areas, said intervening area being (a) at least as large as one of said image areas, (b) initially aligned with the exposure window and (c) movable out of alignment with the window upon rotation of said assembly; and
(b) an opaque cover member mounted on said hub for rotation in the cartridge with said film unit, said cover member including a portion that overlays said intervening area for inhibiting light from entering the cartridge through the cartridge window when said intervening area is aligned with the window.

10. A photographic assembly adapted to be rotatably mounted in an opaque cartridge with an exposure window, said assembly comprising:
(a) a photographic film unit comprising (1) a hub, (2) a photographic film disk mounted on said hub and having an area for receiving images in a generally circular disposition about said hub, (3) means on said hub for use in incrementally rotating said film unit in the cartridge and (4) an open area extending inwardly from the outer perimeter of said disk toward said hub and alignable with the exposure window; and
(b) an opaque cover slide member overlaying said open area and mounted on said hub for rotation in the cartridge with said film unit, said cover slide inhibiting light from entering the cartridge through the window when said intervening area is aligned with the window.

11. A photographic assembly for receiving a plurality of exposures and adapted to be rotatably mounted in photographic apparatus, said assembly comprising:
(a) a generally circular hub member;
(b) a photographic film disk having an area for image exposures disposed about said hub member; and
(c) a plurality of structural discontinuities for use in incrementally rotating said assembly in photographic apparatus, said discontinuities (1) corresponding in number to the number of exposures to be received and (2) being disposed on said hub member in a generally circular disposition.

12. An assembly as claimed in claim 11 wherein said structural discontinuities comprise a plurality of teeth, each tooth including first and second oppositely facing generally radially extending abutment surfaces.

13. An assembly as claimed in claim 11 wherein said hub member includes abutment means for use in inhibiting rotation of said film unit in photographic apparatus.

14. An assembly as claimed in claim 13 further comprising an additional structural discontinuity, on said hub member radially inwardly of the first said discontinuities, for use in disabling said rotation inhibiting means.

15. An assembly as claimed in claim 11 further comprising a segmental open area in said film disk and extending generally inwardly from the outer perimeter of said disk toward said hub member.

16. An assembly as claimed in claim 15 further including:
an opaque cartridge at least partially enclosing said disk; and
a flat cover member attached to said hub member for rotation with said film unit, said cover member including an opaque portion overlaying said segmental open area to inhibit light from reaching said disk from the exterior of said cartridge.

17. A photographic film unit assembly adapted to be rotatably mounted in an opaque cartridge having an exposure window, said assembly comprising:
a hub;
a photographic film disk fixedly attached to said hub;
a plurality of exposure areas on said film disk in a generally circular disposition about the outer perimeter of said hub;
an open area in said disk between the outer perimeter of said disk and said hub initially aligned with the exposure window and movable out of alignment with the window upon rotation of said assembly;
an opaque framing member having an image area framing aperture aligned with the exposure window, said hub and disk being rotatable relative to said framing member to frame respective ones of said exposure areas in said aperture; and
a cover member fixedly attached to said hub between said window and said framing member, said cover member including an opaque portion larger than said framing aperture and overlaying said open area, whereby said cover member and said framing member form a light baffel to light entering through the window when said open area is aligned with the window.

18. A photographic cartridge assembly comprising:
(a) a photographic film unit including:
(1) a hub member having an outer perimeter and means adjacent said outer perimeter for use in rotating said hub member, and
(2) a photographic film disk attached to said hub member and having an area for images about said hub member perimeter; and
(b) a protective cartridge member including:
(1) means for mounting said film unit for rotation relative to said cartridge member, and
(2) first and second opposed opaque wall members disposed to sandwich said film disk therebetween, one of said wall members having an opening permitting access to said rotating means from the exterior of said cartridge member.

19. A photographic cartridge assembly comprising:
(a) a photographic film unit including:
(1) a hub member having an outer perimeter and means adjacent said outer perimeter for use in rotating said hub member,
(2) a photographic film disk attached to said hub member and having an exposure area extending about said hub member perimeter; and
(b) a protective cartridge member including:
(1) means for rotatably mounting said film unit in said cartridge member for rotation relative to said cartridge member,
(2) first and second opposed opaque wall members disposed to sandwich said film disk therebetween, one of said wall members having an opening permitting access to said rotating means from the exterior of said cartridge member, and
(3) an exposure window in one of said wall members and disposed in registry with a portion of said exposure area; and
(c) a flat opaque cover carried by said film unit and disposed between said one wall member and said film disk for movement between a light-blocking position and a light-admitting position with respect to said exposure window to selectively shield said exposure area from actinic light rays.

20. An assembly as claimed in claim 19 further including a flat opaque framing member positioned between said cover and said film disk and having a framing aperture in registry with said exposure window, whereby said framing member cooperates with said cover and said exposure window to provide a labyrinthine light barrier when said cover is in said light-blocking position.

21. A photographic cartridge assembly adapted for use with a camera of the type having film support means and pressure plate means for cooperating with said film support means to position an area of photographic film in a predetermined film plane, said cartridge assembly comprising:
(a) a photographic film unit having (1) a hub, and (2) a photographic film disk attached to said hub and having an exposure area; and
(b) a cartridge member having (1) means for rotatably supporting said film unit and (2) a pair of opposed opaque wall members disposed to sandwich said film disk therebetween, one of said wall members having an exposure window in registry with a portion of said exposure area and sized to receive the camera's film support means in engagement with said film disk, the other of said wall members being positionable by the camera's pressure plate means to position said exposure area portion of said film disk in the predetermined plane within the camera.

22. An assembly as claimed in claim 21 further comprising a flat opaque framing member interposed between said film disk and said one wall member, said framing member having a framing aperture in registry with said exposure window and sized to admit the camera film support means into contact with said film disk.

23. An assembly as claimed in claim 21 further comprising an opaque framing septum formed of a sheetlike material having a relatively uniform thickness, said framing septum:
being interposed between said film disk and said one wall member; and
having edge areas for defining a framing aperture in alignment with said exposure window, said framing aperture being sized whereby the camera film support means is engageable with said edge areas.

24. An assembly as claimed in claim 21 wherein said other wall member includes a relatively flexible region in juxtaposed relationship with said exposure window for engagement by the camera's pressure plate means.

25. A thin laminar photographic film cartridge assembly for use with a camera having film support means and pressure plate means for urging film toward said support means, said cartridge assembly comprising:
a photographic film element; and
first and second opposed opaque wall members on opposite sides of said film element, one of said wall members defining an exposure aperture sized to admit a camera's film support means into contact with said film element and the other of said wall members being (1) relatively flexible at least in a region generally opposite to said exposure aperture and (2) engageable by said pressure plate means to flex such region to urge the film into engagement with the film support means.

26. A thin laminar photographic film cartridge assembly comprising:
(a) a cartridge member including first and second opposite wall members, one of said wall members having an exposure window, and the other of said wall members including a relatively flexible region aligned with said exposure window;
(b) a photographic film disk rotatably mounted in said cartridge member between said walls;
(c) a framing member disposed between said film disk and said one cartridge wall, said framing member having a framing aperture in alignment with said exposure window; and
(d) an opaque cover rotatable with said disk relative to said framing member and said cartridge assembly and interposed between said framing member and said one wall member, said cover being positionable between said exposure window and said framing aperture.

27. A thin laminar photographic film cartridge assembly comprising:
(a) a cartridge member including first and second opposite wall members, one of said wall members having an exposure window, and the other of said wall members including a relatively flexible region aligned with said exposure window;
(b) a photographic film disk rotatably mounted in said cartridge member between said walls, said film disk having an open area extending radially inward from the outer perimeter of said disk;
(c) a framing member disposed between said film disk and said one cartridge wall, said framing member having a framing aperture in alignment with said exposure window; and
(d) an opaque cover rotatable with said disk relative to said framing member and said cartridge assembly and interposed between said framing member and said one wall member, said cover overlaying said open area and being positionable between said exposure window and said framing aperture.

28. A photographic assembly receivable within a camera, said assembly comprising:
(a) a photographic film unit comprising (1) a hub member, and (2) a photographic film disk carried by said hub member and having an exposure area about said support member;

(b) a cartridge member;

(c) means for rotatably mounting said film unit in said cartridge member; and (d) means on said film unit and said mounting means for inhibiting rotation of said film unit relative to said cartridge member prior to the film unit assembly being received within the camera.

29. An assembly as claimed in claim 28 further comprising locking means operative for inhibiting further rotation of said film unit relative to said cartridge member in response to rotation of said film unit through a predetermined arc of rotation relative to said cartridge member.

30. An assembly as claimed in claim 29 including indicator means, responsive to operation of said locking means, for providing a signal visible from outside the film unit assembly to indicate that such operation has occurred.

31. A photographic film cartridge assembly receivable within a camera having an unlocking member, said assembly comprising:

(a) a photographic film unit comprising (1) a hub member, (2) a photographic film disk carried by said hub member and having an exposure area around said hub member;

(b) an opaque cartridge member at least partially enclosing said disk;

(c) means on said cartridge member for rotatably supporting said film unit for rotation relative to said cartridge member; and (d) means on said film unit and said cartridge member for inhibiting rotation of said film unit relative to said cartridge member, said inhibiting means comprising (1) a latch member, (2) a flexible member movable relative to said latch member upon rotation of said film unit relative to said cartridge member, said flexible member having a first condition in which it is in locking engagement with said latch member to inhibit rotation of said film unit relative to said cartridge member and a second condition in which it is ineffective to inhibit rotation of said film unit and (3) means actuatable by the camera unlocking member for changing said flexible member from its first condition to its second condition.

32. An assembly as claimed in claim 31 wherein said flexible member is adjustable to a third condition in response to relative rotation of said film unit through a predetermined arc of travel subsequent to said flexible member assuming its second condition, wherein rotation of said film unit relative to said cartridge member is again inhibited and wherein said actuatable means is ineffective to change said flexible member to its second condition.

33. A photographic film cartridge assembly receivable within a camera having an unlocking member, said assembly comprising:

(a) a photographic film unit comprising (1) a hub member, and (2) a photographic film disk carried by said hub member and having an exposure area around said hub member;

(b) an opaque cartridge member at least partially enclosing said hub member;

(c) means on said cartridge member for rotatably supporting said film unit for rotation relative to said cartridge member;

(d) a latch member having an abutment surface on one of said hub member and said cartridge member;

(e) an elongate flexible cantilevered finger member on the other of said hub member and cartridge member, said finger member being angularly movable relative to said latch member in response to rotation of said film unit relative to said cartridge member, said finger member having an initial angular position wherein said finger member lockingly engages said abutment surface to prevent rotation of said film unit relative to said cartridge member; and (f) means actuatable by said camera unlocking member for releasing said finger member from locking engagement with said abutment surface to permit rotation of said film unit.

34. An assembly as claimed in claim 33 wherein said latch member has a second abutment surface and wherein said finger member engages said second abutment surface in response to relative rotation of said film unit through a predetermined arc of travel subsequent to the release of said locking engagement to inhibit further rotation of said film unit relative to said cartridge member, said actuatable means being thereupon ineffective to release said finger member from engagement with said second abutment surface.

35. A photographic film unit adapted to be rotatably mounted in an opaque cartridge having an exposure window, said unit comprising:

a hub member;

a photographic film disk attached to said hub member and having an area for images around the outer perimeter of said hub member; and an open segment on said film disk extending radially inwardly from the outer perimeter of said disk toward said hub to render said image area noncontinuous, whereby said image area is not aligned with the exposure window when the open segment is aligned with the exposure window.

36. A photographic film unit adapted to be rotatably mounted in an opaque cartridge having an exposure window, said unit comprising:

a photographic film disk;

means on said film disk defining the borders of respective ones of a plurality of exposure areas at predetermined locations along a generally circular path; and an open segment on said film disk extending generally inwardly from the outer perimeter of said disk and intercepting said path, whereby said image area is not aligned with the exposure window when the open segment is aligned with the exposure window.

37. A photographic film unit adapted to be rotatably mounted in photographic apparatus, said film unit comprising:

a hub;

a photographic film disk carried by said hub and having an image area about the outer perimeter of said hub;

means on said hub for use in incrementally rotating said film unit in photographic apparatus; and an open area in said film disk between the outer perimeter of said disk and said hub and intercepting said image area to render said image area discontinuous.

38. A photographic film unit comprising:

a hub member;

a photographic film disk attached to said hub member and having an area for images around the outer perimeter of said hub member; and an open segment on said film disk extending radially inwardly from the outer perimeter of said disk toward said hub to render said image area noncontinuous.

* * * * *

UNITED STATES PATENT AND TRADEMARK OFFICE
CERTIFICATE OF CORRECTION

PATENT NO. : 4,264,169
DATED : April 28, 1981
INVENTOR(S) : Donald M. Harvey

It is certified that error appears in the above—identified patent and that said Letters Patent is hereby corrected as shown below:

Col. 1, line 8, delete "744,715" and insert --774,715--.

Col. 5, line 6, after "film" (first occurrence), insert --unit--.

Col. 5, line 15, delete "744,715" and insert --774,715--.

Col. 9, line 43, delete ";" after "65" and insert "."

Col. 12, line 8, after "142" insert "."

Col. 13, line 1, delete "remains" and insert --reminds--.

Signed and Sealed this

Twenty-ninth Day of September 1981

[SEAL]

Attest:

Attesting Officer

GERALD J. MOSSINGHOFF

Commissioner of Patents and Trademarks